(12) United States Patent
Yang et al.

(10) Patent No.: US 11,831,062 B2
(45) Date of Patent: Nov. 28, 2023

(54) MOBILE DEVICE RADIATING ANTENNA DISPOSED ON AN INNER SIDE OF AN INSULATION REAR HOUSING

(71) Applicant: HUAWEI TECHNOLOGIES CO., LTD., Shenzhen (CN)

(72) Inventors: Yu Chan Yang, Shenzhen (CN); Chien-Ming Lee, Shanghai (CN); Hanyang Wang, Reading (GB); Dong Yu, Shanghai (CN); Yi-Hsiang Liao, Shenzhen (CN); Xiaoli Yang, Shanghai (CN); Jiaqing You, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/874,597

(22) Filed: Jul. 27, 2022

(65) Prior Publication Data

US 2022/0368007 A1    Nov. 17, 2022

Related U.S. Application Data

(63) Continuation of application No. 16/954,591, filed as application No. PCT/CN2019/098310 on Jul. 30, 2019, now Pat. No. 11,450,946.

(30) Foreign Application Priority Data

Jul. 31, 2018    (CN) .......................... 201810858567.0

(51) Int. Cl.
*H01Q 1/24*    (2006.01)
*H04M 1/02*    (2006.01)

(52) U.S. Cl.
CPC ............ *H01Q 1/243* (2013.01); *H04M 1/026* (2013.01)

(58) Field of Classification Search
CPC .... H04Q 1/243; H04M 1/026; H04M 1/0202; H01Q 1/38; H01Q 1/50; H01Q 1/244; H01Q 1/242; H01Q 1/241; H01Q 1/40
See application file for complete search history.

(56) References Cited

U.S. PATENT DOCUMENTS

| 6,903,645 | B2  |   | 6/2005 | Mizoguchi et al. |           |
|-----------|-----|---|--------|------------------|-----------|
| 11,011,850| B2  | * | 5/2021 | Wu ..........     | H01Q 5/357|
| 11,450,946| B2  | * | 9/2022 | Yang ........     | H01Q 1/243|

(Continued)

FOREIGN PATENT DOCUMENTS

| CN | 201117800 Y | 9/2008 |
| CN | 201204582 Y | 3/2009 |

(Continued)

*Primary Examiner* — Yuwen Pan
*Assistant Examiner* — Angelica Perez
(74) *Attorney, Agent, or Firm* — Maier & Maier, PLLC

(57) ABSTRACT

A mobile terminal and a mobile terminal antenna production method. The mobile terminal uses an insulation film layer on an insulation rear housing as a carrier of a radiating element of an antenna, and the radiating element is located within the entire mobile terminal. A feed and an electric-conductor are disposed on a circuit board, and the electric-conductor is electrically connected to the feed. There is a gap between the radiating element and the electric-conductor, and the electric-conductor indirectly couples the radiating element in a capacitively coupled manner.

20 Claims, 4 Drawing Sheets

(56) References Cited

U.S. PATENT DOCUMENTS

| | | | | |
|---|---|---|---|---|
| 2013/0101149 A1* | 4/2013 | Maenpaa | ............ | H04B 5/0075 |
| | | | | 381/331 |
| 2015/0171916 A1 | 6/2015 | Asrani et al. | | |
| 2015/0207208 A1* | 7/2015 | Liu | ........................ | H01Q 1/243 |
| | | | | 343/702 |
| 2017/0005392 A1 | 1/2017 | Hwang et al. | | |
| 2018/0332741 A1* | 11/2018 | Treossi | ............ | G06K 19/07749 |
| 2019/0207318 A1* | 7/2019 | Wu | ........................ | H01Q 9/26 |
| 2019/0296438 A1* | 9/2019 | Yen | ........................ | H01Q 5/371 |
| 2020/0321688 A1* | 10/2020 | Khripkov | ............... | H01Q 21/28 |

FOREIGN PATENT DOCUMENTS

| | | | | |
|---|---|---|---|---|
| CN | 201425967 Y | 3/2010 | | |
| CN | 102610534 A | 7/2012 | | |
| CN | 102623788 A | 8/2012 | | |
| CN | 102668236 A | 9/2012 | | |
| CN | 202662772 U | 1/2013 | | |
| CN | 103957022 A | 7/2014 | | |
| CN | 203787558 U | 8/2014 | | |
| CN | 104270900 A | 1/2015 | | |
| CN | 104600182 A | 5/2015 | | |
| CN | 104953270 A | 9/2015 | | |
| CN | 205376745 U | 7/2016 | | |
| CN | 103367865 B | 4/2017 | | |
| CN | 107332959 A | 11/2017 | | |
| CN | 108232425 A | 6/2018 | | |
| CN | 108242592 B * | 1/2020 | ............... | H01Q 1/22 |
| KR | 101261983 B1 | 5/2013 | | |
| WO | 2011051408 A1 | 5/2011 | | |
| WO | WO-2011051408 A1 * | 5/2011 | ....... | B29C 45/14639 |

\* cited by examiner

MOBILE DEVICE RADIATING ANTENNA DISPOSED ON AN INNER SIDE OF AN INSULATION REAR HOUSING

CROSS-REFERENCE TO RELATED APPLICATIONS

This application is a continuation of U.S. patent application Ser. No. 16/954,591, filed on Jun. 17, 2020, which is a national stage of International Application No. PCT/CN2019/098310, filed on Jul. 30, 2019, which claims priority to Chinese Patent Application No. 201810858567.0, filed on Jul. 31, 2018. All of the aforementioned applications are hereby incorporated by reference in their entireties.

TECHNICAL FIELD

The embodiments relate to the field of antenna technologies, and a mobile terminal, and a mobile terminal antenna production method.

BACKGROUND

Currently, functions of smart phones are increasing each passing day, and the smart phones need to cover an increasingly wide communication range. A mobile phone apparatus also has increasing requirements for both an antenna and an antenna quantity. How to place more antennas in limited space is one of urgent problems to be resolved in the antenna structure field. Currently, common antenna designs all use a support, such as a laser direct structuring (LDS) technology or a metal bezel of a mobile phone as an antenna radiator. An antenna may be an IFA, a monopole antenna, or a loop antenna. However, with increasing requirements of various components and functions on a mobile phone end, the foregoing conventional method is limited in future application, and a clearance area required during antenna radiation is reduced accordingly. In addition, an LDS antenna structured on support plastic is usually placed inside a mobile phone body and is more liable to be affected by peripheral parts and components. Besides, because the antenna is comparatively short, the antenna is liable to be limited in space freedom or in efficiency and a bandwidth.

SUMMARY

The embodiments provide a mobile terminal and a mobile terminal antenna production method, so as to improve communication performance of the mobile terminal.

According to a first aspect, a mobile terminal is provided. The mobile terminal includes a mobile terminal body and an insulation rear housing that covers the mobile terminal body. An insulation film layer covers an inner side of the insulation rear housing. The inner side of the insulation rear housing is a surface facing the mobile terminal body when the insulation rear housing covers the mobile terminal body. In addition, the mobile terminal further includes an antenna. The antenna includes a feed and a radiating element electrically connected to the feed. The feed is disposed on a circuit board in the mobile terminal body, and the radiating element is printed on the insulation film layer. It can be understood from the foregoing description that the insulation film layer on the insulation rear housing serves as a carrier of the radiating element of the antenna, and the radiating element is located within the entire mobile terminal, thereby effectively increasing a height of the radiating element of the antenna relative to the circuit board with the antenna not affecting an appearance of the mobile terminal (compared with a conventional support solution, this manner can increase a height of about 0.2 mm to 0.6 mm). This reduces an impact caused by a metal component on the circuit board on antenna radiation, and further increases a bandwidth and efficiency of the antenna so that the antenna can cover a frequency band used in a handheld communications system.

When being disposed, the radiating antenna uses a metallic wire. The metallic wire may be a straight metallic wire, a curved metallic wire, or a spiral metallic wire, and a shape is not limited. The metallic wire may be prepared using different materials such as aluminum, copper, and silver. In an embodiment, the metallic wire is a silver wire.

For a disposing position of the radiating antenna, the radiating antenna may be disposed in any position on the inner side of the insulation rear housing as needed, for example, a position on a side wall.

To improve a radiation effect of the antenna, when the metallic wire is disposed, a thickness of the metallic wire is between 1 μm and 200 μm, and an impedance of the metallic wire is less than 3 ohms, or a square resistance of the metallic wire is less than 1 ohm/□.

The insulation rear housing may be prepared using different materials, provided that insulation can be ensured. For example, the insulation rear housing is a glass rear housing or plastic rear housing.

For the insulation film layer, film layers with different functions may be used. For example, the insulation film layer is an ink film layer, a decorative film layer, or an anti-explosion film layer.

For the antenna, antennas of different types may be used. For example, the antenna is one or more of a GPS antenna, a Wi-Fi antenna, an NFC antenna, a millimeter-wave antenna, a diversity antenna, or a main antenna.

When the feed and the radiating element are connected electrically, the antenna further includes an electric-conductor. The electric-conductor is electrically connected to the feed and/or a ground, and the electric-conductor is connected to the radiating element in a coupled manner. In other words, an electrical connection between the electric-conductor and the radiating element is implemented in a coupled manner. Compared with a manner, in a general conventional solution, in which a signal line of the circuit board is directly connected to the antenna, feeding in a coupled manner can avoid problems caused by direct electrical-connection feeding, such as uneven contact pressure and a problem that impedance of a contact point becomes unstable after a long period of time due to factors such as oxidation.

When the electric-conductor is disposed, different solutions may be used. For example, in a solution, the mobile terminal further includes a circuit board that is disposed in the mobile terminal body, and the feed and the ground are disposed on the circuit board; and a support is disposed on the circuit board, and the electric-conductor is a metallic wire disposed on the support, where one end of the metallic wire is electrically connected to the feed, and the other end of the metallic wire is connected to the radiating element in a coupled manner; or one end of the metallic wire is electrically connected to the ground, and the other end of the metallic wire is connected to the radiating element in a coupled manner; or one end of the metallic wire is electrically connected to the feed, the other end of the metallic wire is electrically connected to the ground, and the metallic wire is connected to the radiating element in a coupled manner. In other words, the metallic wire is directly disposed on the support to implement a coupling connection.

In another solution, the mobile terminal further includes a circuit board that is disposed in the mobile terminal body, and the feed and the ground are disposed on the circuit board; and the electric-conductor is a metal spring plate, where one end of the metal spring plate is electrically connected to the feed, and the other end of the metal spring plate is connected to the radiating element in a coupled manner; or one end of the metal spring plate is electrically connected to the ground, and the other end of the metal spring plate is connected to the radiating element in a coupled manner; or one end of the metal spring plate is electrically connected to the feed, the other end of the metal spring plate is electrically connected to the ground, and the metal spring plate is connected to the radiating element in a coupled manner.

When the metal spring plate is used, the metal spring plate may be in different shapes. For example, the metal spring plate is an inverted L-shaped metal spring plate or an inverted U-shaped metal spring plate.

According to a second aspect, a mobile terminal antenna production method is provided. The production method includes the following steps.

Print a radiating element on an insulation film layer. For example, spray silver paste on the film layer, and then bake the silver paste and the insulation film layer at 50 degrees to 200 degrees for 30 minutes to 60 minutes, to form a metallic wire.

Stick the insulation film layer to an inner side of an insulation rear housing.

The insulation film layer on the insulation rear housing serves as a carrier of the radiating element of an antenna, and the radiating element is located within an entire mobile terminal, thereby effectively increasing a height of the radiating element of the antenna relative to a circuit board with the antenna not affecting an appearance of the mobile terminal (compared with a conventional support solution, this manner can increase a height of about 0.2 mm to 0.6 mm). This reduces an impact caused by a metal component on the circuit board on antenna radiation, and further increases a bandwidth and efficiency of the antenna so that the antenna can cover a frequency band used in a handheld communications system.

The used silver paste includes 50-99 wt % silver powder, and viscosity of the silver paste is 10-20000 cps.

After the metallic wire is formed, a thickness of the metallic wire is between 1 μm and 200 μm, and an impedance of the metallic wire is less than 3 ohms, or a square resistance of the metallic wire is less than 1 ohm/□, to ensure that the antenna can have good communication performance.

The production method further includes: producing a feed and a ground on the circuit board and connecting an electric-conductor to the feed and/or the ground electrically, where the electric-conductor is connected to the radiating element in a coupled manner.

When the electric-conductor is in different structural forms, different production manners may be used. For example, the connecting an electric-conductor to the feed and/or the ground electrically, where the electric-conductor is connected to the radiating element in a coupled manner, is: disposing a support on the circuit board, and printing a metallic wire on the support, where one end of the metallic wire is electrically connected to the feed, and the other end of the metallic wire is connected to the radiating element in a coupled manner; or one end of the metallic wire is electrically connected to the ground, and the other end of the metallic wire is connected to the radiating element in a coupled manner; or one end of the metallic wire is electrically connected to the feed, the other end of the metallic wire is electrically connected to the ground, and the metallic wire is connected to the radiating element in a coupled manner.

When the electric-conductor is a metal spring plate, the connecting an electric-conductor to the feed and/or the ground electrically, where the electric-conductor is connected to the radiating element in a coupled manner, is: connecting one end of the metal spring plate to the feed electrically, and connecting the other end of the metal spring plate to the radiating element in a coupled manner; or connecting one end of the metal spring plate to the ground electrically, and connecting the other end of the metal spring plate to the radiating element in a coupled manner; or connecting one end of the metal spring plate to the feed electrically, and connecting the other end of the metal spring plate to the ground electrically, where the metal spring plate and the radiating element are connected in a coupled manner. In other words, the electric-conductor may be formed in different structural forms.

DETAILED DESCRIPTION OF THE EMBODIMENTS

To make the objectives, solutions, and advantages of the embodiments clearer, the following further describes the embodiments in detail with reference to the accompanying drawings.

Figure 1:
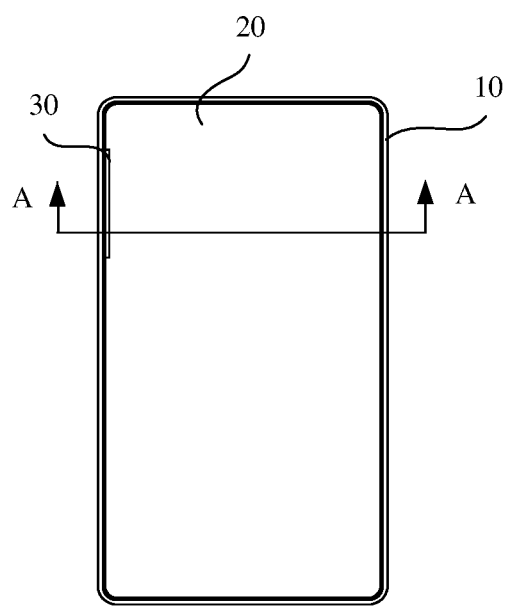
FIG. 1 is a schematic structural diagram of a mobile terminal according to an embodiment.
Figure 2:
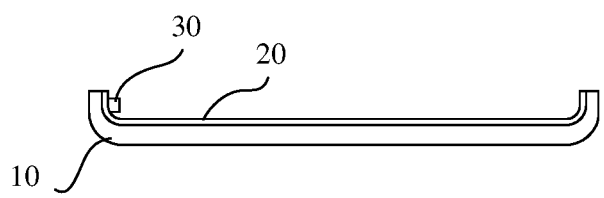
FIG. 2 is a sectional view at A-A in FIG. 1.
Figure 4:
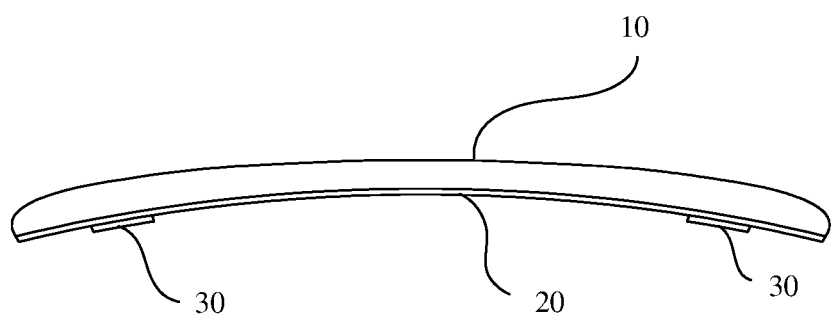
FIG. 4 is a schematic structural diagram of another mobile terminal according to an embodiment.

An embodiment provides a mobile terminal. The mobile terminal includes a mobile terminal body and an insulation rear housing 10 that covers the mobile terminal body. The insulation rear housing 10 is a phone housing of the mobile terminal. FIG. 1 and FIG. 2 show a structure of the insulation rear housing 10. First, as shown in FIG. 1 and FIG. 2, the insulation rear housing 10 is a rectangular structure and includes a flat plate and four bent side walls. During bending, as shown in FIG. 2, where FIG. 2 shows a sectional view at A-A in FIG. 1, a connection manner between the side wall and the flat plate is clearly shown in FIG. 2, where an arc-shaped transition is used at a joint between the bent side wall and the flat plate. In addition, during production, the insulation rear housing 10 is formed in an integrated structuring manner. However, the structure of the insulation rear housing 10 is not limited to the structure shown in FIG. 1 and FIG. 2, and a structure shown in FIG. 4 may be alternatively used. When the structure shown in FIG. 4 is used, the insulation rear housing 10 is an arc-shaped rear housing. However, the structure of the insulation rear housing 10 may alternatively be in another structural form. For ease of description, an inner side of the insulation rear housing 10 is defined. The inner side of the insulation rear housing 10 in this embodiment is a concave side of the insulation rear housing 10. When the insulation rear housing 10 is mounted on the mobile terminal body, the inner side faces the mobile terminal body.

Different materials such as glass and plastic may be selected for the insulation rear housing 10 provided in this embodiment, provided that insulation can be implemented. For example, when a glass material is used, the insulation rear housing 10 is a glass rear housing 10.

Still referring to FIG. 1, an insulation film layer 20 covers the inner side of the insulation rear housing 10. As a bearing structure, the insulation film layer 20 is configured to bear a radiating element 30 of an antenna. For the insulation film layer 20, film layers with different functions may be used. For example, the insulation film layer 20 is an ink film layer, a decorative film layer, or an anti-explosion film layer. A material used by the insulation film layer 20 may be plastic. When the insulation film layer 20 covers the inner side of the insulation rear housing 10, the insulation film layer 20 is adhered to the inner side of the insulation rear housing 10 by an adhesive or fixed to the inner side of the insulation rear housing 10 through vacuum adsorption.

Figure 3:
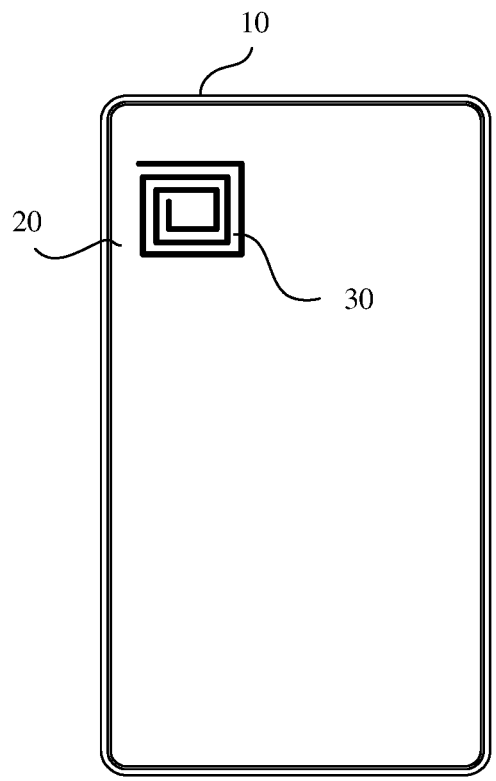
FIG. 3 is a schematic structural diagram of another mobile terminal according to an embodiment.

Still referring to FIG. 1 and FIG. 2, the mobile terminal provided in this embodiment further includes an antenna. For the antenna, antennas of different types may be used. For example, the antenna is one or more of a GPS antenna, a Wi-Fi antenna, an NFC antenna, a millimeter-wave antenna, a diversity antenna, or a main antenna. It can be understood that the antenna provided includes one or more of antennas of the foregoing several types but is not limited to the antennas of the foregoing listed types, and regardless of an antenna that is used, the antenna provided in this embodiment includes the following two structures: a feed and the radiating element 30. The feed is electrically connected to the radiating element 30. When the feed is disposed, the feed is disposed on a circuit board in the mobile terminal body. The circuit board may be a PCB board. To improve performance of the antenna, when the radiating element 30 is disposed, as shown in FIG. 1 and FIG. 2, the radiating element 30 is printed on the insulation film layer 20. The radiating element 30 uses a metallic wire and may be in different shapes. As shown in FIG. 1 and FIG. 2, the metallic wire may be a straight metallic wire, or may be in another structure, for example, a curved metallic wire, or a spiral metallic wire shown in FIG. 3. It can be understood from FIG. 1 and FIG. 3 that a shape of the radiating element 30 is not limited, and a different choice may be made as needed. In addition, for a disposing position of the radiating element 30, the radiating element 30 may be disposed in any position on the insulation film layer 20. It can be understood from FIG. 1 and FIG. 2 that there is not another structure on the insulation film layer 20. Therefore, a different position may be selected as needed for disposing the radiating element 30. As shown in FIG. 1 and FIG. 2, the radiating element 30 is disposed on the side wall of the insulation rear housing 10; and, as shown in FIG. 3, the radiating element 30 is disposed on the flat plate of the insulation rear housing 10. In addition, a quantity of radiating elements 30 is not limited. For example, there is one radiating element 30 shown in FIG. 1, and there are two radiating elements 30 shown in FIG. 4. In addition, the metallic wire may be prepared using different materials, such as aluminum, copper, and silver. In an embodiment, the metallic wire is a silver wire, which has good electrical conductivity.

When the radiating element 30 is produced, the radiating element 30 is structured on the insulation film layer 20 by using a metal printing process. In this embodiment, the metallic wire is prepared using silver paste. Therefore, the following uses the silver paste as an example for description. First, a component of the silver paste used includes 50-99 wt % (mass percentage) silver powder, and viscosity of the formed silver paste is 10-20000 cps (mPa·s), to ensure that the silver paste can be stably adhered to the insulation film layer 20. During printing, first, the silver paste is sprayed or printed on the insulation film layer 20 (a decorative film layer, an anti-explosion film layer, or an ink film layer may be selected), and then, the silver paste and the insulation film layer 20 are baked at 50 degrees to 200 degrees for 30 min to 60 min (minutes), to increase adhesion on the insulation film layer 20. Then, the silver paste is formed to a thickness of 1 μm to 200 μm (micrometers). Further, it is ensured that an impedance of the prepared silver paste is less than 3 ohms (including 1 ohm) (a definition for testing: a value, expressed in ohms, measured between any two points on the antenna). In other words, a thickness of a printed metallic wire is between 1 μm and 200 μm, for example, 3 μm, 5 μm, 10 μm, 15 μm, or 20 μm. In addition, an impedance of the metallic wire is less than 3 ohms, or a square resistance of the metallic wire is less than 1 ohm/□, where the square resistance is defined as follows. When a length is represented by l, a width is represented by w, and a height is represented by d (that is, a thickness of the film), L (length) =l, and S (cross-sectional area)=w*d; and therefore, R=ρ*l/(w*d)=(ρ/d)*(l/w). Let l=w, and then, R=(ρ/d), where ρ is resistivity of a material. In this case, R is the square resistance and is expressed in ohm/□, where "□" indicates that a cross section of the metallic wire is a square.

During disposing, two different manners may be used. One manner is: first printing the radiating element 30 on the insulation film layer 20 and then sticking the insulation film layer 20 into the insulation rear housing 10. The other manner is: first sticking the insulation film layer 20 into the insulation rear housing 10 and then printing the radiating element 30 on the insulation film layer 20. As shown in FIG. 2 and FIG. 4, when a position corresponding to the radiating element 30 is arc-shaped, the manner of first printing the radiating element 30 on the insulation film layer 20 greatly facilitates disposing of the radiating element 30.

It can be understood from the foregoing description that the insulation film layer 20 on the inner side of the insulation rear housing 10 is configured to support the radiating element 30 of the antenna, so that the radiating element 30 is located within the entire mobile terminal, thereby effectively increasing a height of the radiating element 30 of the antenna relative to the circuit board with the antenna not affecting an appearance of the mobile terminal. Compared with a conventional support solution, this manner can increase a height of about 0.2 mm to 0.6 mm, thereby reducing an impact caused by a metal component on the circuit board on antenna radiation, and further increasing a bandwidth and efficiency of the antenna so that the antenna can cover a frequency band used in a handheld communications system.

When the antenna is disposed, the antenna not only includes the radiating element 30, but also includes the feed and a ground, and the feed and the ground are electrically connected to the radiating element 30. To implement electrical connections of the feed and the ground to the radiating element 30, an electric-conductor is further disposed in the antenna provided in this embodiment. The electric-conductor is electrically connected to the feed and/or the ground, and the electric-conductor is connected to the radiating element 30 in a coupled manner. It should be understood that a coupling connection is an indirect coupling connection, that is, there is a gap between the radiating element 30 and the electric-conductor, and an electrical connection is implemented in a capacitively coupled manner. When the electric-conductor is disposed, the electric-conductor may be in different structural forms. The following describes implementations of two electric-conductors with reference to FIG. 5 and FIG. 7.

Figure 5:
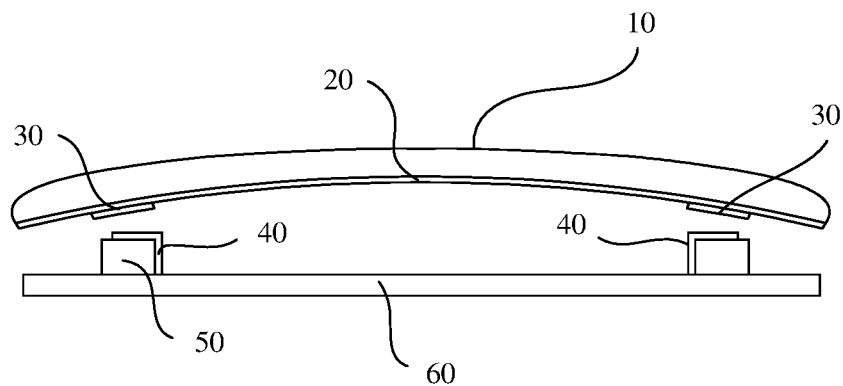
FIG. 5 is a schematic structural diagram of an antenna according to an embodiment n.
Figure 6:
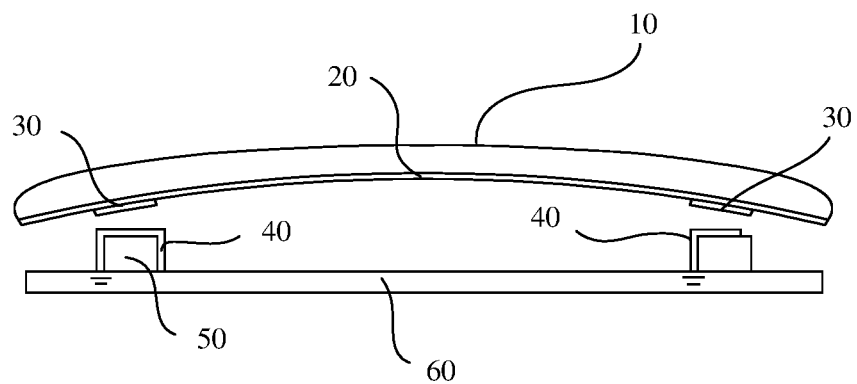
FIG. 6 is a schematic structural diagram of another antenna according to an embodiment.

As shown in FIG. 5, a feed is disposed on a circuit board 60 in a mobile terminal body, and a support 50 is further disposed on the circuit board 60. The support 50 is used as a support carrier to support an electric-conductor. In the structure shown in FIG. 5, the electric-conductor is a metallic wire 40. The metallic wire 40 is fixed on the support in a printing or flexible-plate sticking manner. In addition, a quantity of electric-conductors is in a one-to-one correspondence with a quantity of radiating elements 30. When two radiating elements 30 are used in FIG. 5, there are two corresponding electric-conductors, and there are also two corresponding supports 50. The support 50 may be in different structural forms. For example, in FIG. 5, the support 50 is a support block, and the support block is fixed on the circuit board 60 in a sticking manner. It can be understood that as a carrier, the support 50 should be insulated, to avoid affecting power feeding of the electric-conductor. FIG. 5 is a schematic diagram of an electrical connection between the metallic wire 40 and the feed. As shown in FIG. 6, a placement direction of a mobile terminal shown in FIG. 6 is used as a reference direction. A metallic wire 40 located on the right side is electrically connected to the ground, and two ends of a metallic wire 40 located on the left side are electrically connected to the ground and the feed separately. When the metallic wires 40 are electrically connected to the ground, a disposing manner of the metallic wires 40 is similar to that in FIG. 5, and an only difference lies in that one metallic wire 40 is connected to the feed on the circuit board 60, and the other metallic wire 40 is connected to the ground on the circuit board 60. When the two ends of the metallic wire 40 are separately connected to the feed and the ground, one end of the metallic wire 40 is connected to a feed point, and the other end of the metallic wire 40 is connected to the ground. The metallic wire 40 is connected to the radiating element 30 in a coupled manner. A coupling portion is a portion between the two ends.

Figure 7:
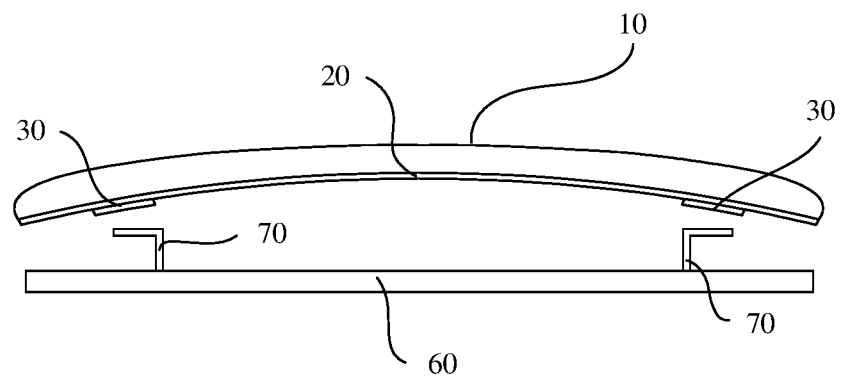
FIG. 7 is a schematic structural diagram of another antenna according to an embodiment.
Figure 8:
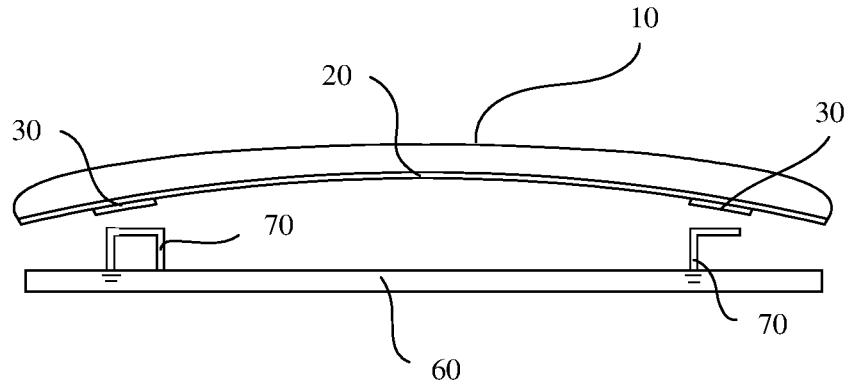
FIG. 8 is a schematic structural diagram of another antenna according to an embodiment.

FIG. 7 shows a structure of another electric-conductor. In FIG. 7, the electric-conductor is a metal spring plate 70. One end of the metal spring plate 70 is fixed (electrically connected) to the feed, and the other end of the metal spring plate 70 is a free end. The free end of the metal spring plate 70 is connected to the radiating element 30 in a coupled manner. During disposing, as shown in FIG. 7, the metal spring plate 70 is an inverted L-shaped metal spring plate 70. However, a structural form of the metal spring plate 70 is not limited to the one specified in FIG. 7. The metal spring plate 70 may alternatively be an arc-shaped metal sheet, or a wavy metal spring plate 70, and both may be applied to the embodiments. For a material of the metal spring plate 70, the material may have good electrical conductivity and strength, such as copper, aluminum, or iron. As shown in FIG. 8, a placement direction of a mobile terminal shown in FIG. 8 is used as a reference direction. A metal spring plate 70 located on the right side is electrically connected to the ground, and two ends of a metal spring plate 70 located on the left side are electrically connected to the ground and the feed separately. When the metal spring plate 70 is electrically connected to the ground, a disposing manner of the metal spring plate 70 is similar to that in FIG. 7, and an only difference lies in that one metal spring plate 70 is connected to the feed on the circuit board 60, and the other metal spring plate 70 is connected to the ground on the circuit board 60. When the two ends of the metal spring plate 70 are separately connected to the feed and the ground, one end of the metal spring plate 70 is connected to a feed point, and the other end of the metal spring plate 70 is connected to the ground. The metal spring plate 70 is connected to the radiating element 30 in a coupled manner. A coupling portion is a portion between the two ends. In this case, the metal spring plate 70 is an inverted U-shaped structure.

It can be understood from FIG. 5 to FIG. 8 that in the antenna, the electrical connection between the electric-conductor and the radiating element and an electrical connection between the electric-conductor and the ground are implemented in a coupled manner. Compared with a manner, in a general conventional solution, in which a signal line of the circuit board 60 is directly connected to the antenna, feeding in a coupled manner can avoid problems caused by direct electrical-connection feeding, such as uneven contact pressure and a problem that impedance of a contact point becomes unstable after a long period of time due to factors such as oxidation.

In addition, the embodiments further provide an antenna production method. The method includes: printing a radiating element 30 on an insulation film layer 20 and sticking the insulation film layer 20 to an inner side of an insulation rear housing 10. The method includes two different manners: first printing a radiating element 30 on an insulation film layer 20, and then sticking the insulation film layer 20 into an insulation rear housing 10; or first sticking an insulation film layer 20 into an insulation rear housing 10, and then printing a radiating element 30 on the insulation film layer 20. As shown in FIG. 2 and FIG. 4, it can be understood from FIG. 1 and FIG. 4 that when a position corresponding to the radiating element 30 is arc-shaped, the manner of first printing the radiating element 30 on the insulation film layer 20 greatly facilitates disposing of the radiating element 30.

Figure 9:
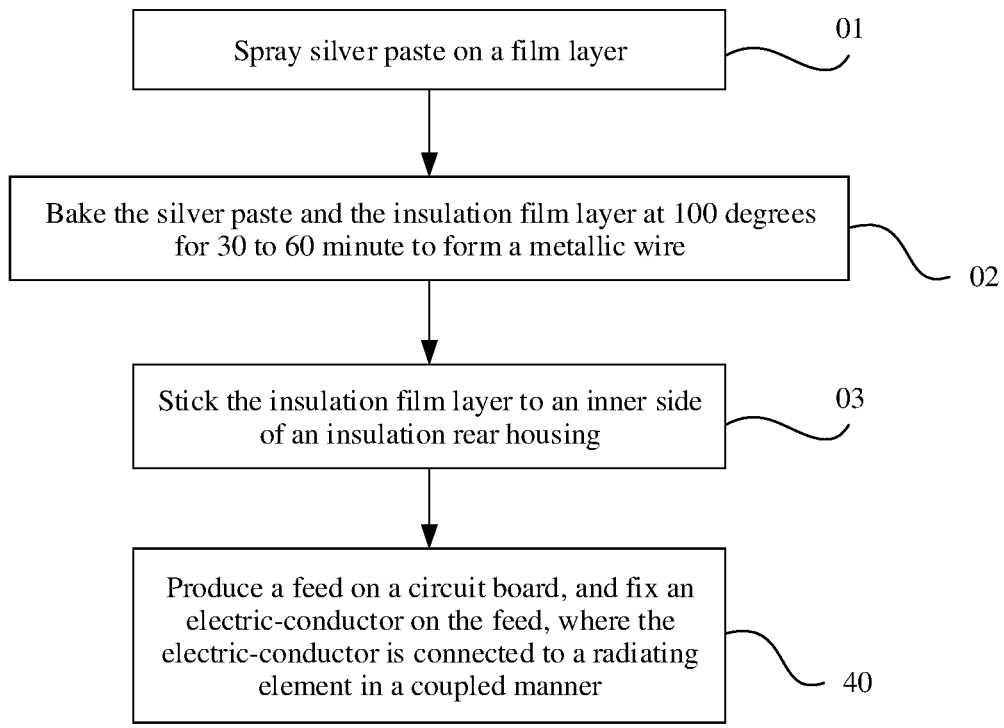
FIG. 9 is a flowchart of producing a mobile terminal antenna according to an embodiment.

The following describes the method in detail with reference to FIG. 9.

Step 01: Spray silver paste on the insulation film layer 20.

For example, a material of the used silver paste includes 50-99 wt % (mass percentage) silver powder, and viscosity of the silver paste is 10-20000 cps (mPa·s), so that the silver paste can be firmly adhered to the insulation film layer 20.

Step 02: Bake the silver paste and the insulation film layer at 50 degrees to 200 degrees for 30 min to 60 min (minutes), to form a metallic wire.

When the metallic wire is formed, a thickness of the metallic wire is between 1 μm and 200 μm (micrometers), for example, 3 μm, 5 μm, 10 μm, 15 μm, or 20 μm. In addition, an impedance of the metallic wire is less than 3 ohms, or a square resistance of the metallic wire is less than 1 ohm/□, to ensure that an antenna can have good communication performance.

Step 03: Stick the insulation film layer 20 to an inner side of the insulation rear housing 10.

For example, the insulation film layer 20 on which the metallic wire is printed is stuck into the insulation rear housing 10 by an adhesive.

Step 04: Produce a feed and a ground on a circuit board and connect an electric-conductor to the feed and/or the ground electrically, where the electric-conductor is connected to the radiating element in a coupled manner.

During disposing, when the electric-conductor is in different structural forms, different production manners may be used. For example, when the electric-conductor is a metallic wire, the fixing the electric-conductor on the feed may include disposing a support on the circuit board, and printing the metallic wire on the support, where one end of the metallic wire is electrically connected to the feed, and the other end of the metallic wire is connected to the radiating element in a coupled manner; or one end of the metallic wire is electrically connected to the ground, and the other end of the metallic wire is connected to the radiating element in a coupled manner; or one end of the metallic wire is electrically connected to the feed, the other end of the metallic wire is electrically connected to the ground, and the metallic wire is connected to the radiating element in a coupled manner.

When the electric-conductor is a metal spring plate, the fixing of the electric-conductor on the feed is: connecting one end of the metal spring plate to the feed electrically, and connecting the other end of the metal spring plate to the radiating element in a coupled manner; or connecting one end of the metal spring plate to the ground electrically, and connecting the other end of the metal spring plate to the radiating element in a coupled manner; or connecting one end of the metal spring plate to the feed electrically, and connecting the other end of the metal spring plate to the ground electrically, where the metal spring plate and the radiating element are connected in a coupled manner.

It can be understood from the foregoing description that the insulation film layer 20 on the insulation rear housing 10 serves as a carrier of the radiating element 30 of the antenna, and the radiating element 30 is located within an entire mobile terminal, thereby effectively increasing a height of the radiating element 30 of the antenna relative to the circuit board with the antenna not affecting an appearance of the mobile terminal. Compared with a conventional support solution, this manner can increase a height of about 0.2 mm to 0.6 mm, thereby reducing an impact caused by a metal component on the circuit board on antenna radiation, and further increasing a bandwidth and efficiency of the antenna so that the antenna can cover a frequency band used in a handheld communications system. In addition, in the antenna, an electrical connection between the electric-conductor and the radiating element is implemented in a coupled manner. Compared with a manner, in a general conventional solution, in which a signal line of the circuit board is directly connected to the antenna, feeding in a coupled manner can avoid problems caused by direct electrical-connection feeding, such as uneven contact pressure and a problem that impedance of a contact point becomes unstable after a long period of time due to factors such as oxidation.

The foregoing descriptions are merely embodiments but are not intended as limiting. Any variation or replacement readily figured out by a person of ordinary skill in the art shall fall within the scope of the embodiments.

What is claimed is:

1. A mobile terminal, comprising:
   a mobile terminal body comprising a circuit board and a support disposed on the circuit board, wherein the support is insulated;
   an insulation rear housing that covers the mobile terminal body, the insulation rear housing comprising an inner side facing the mobile terminal body, wherein an insulation film layer covers the inner side of the insulation rear housing; and
   an antenna, comprising:
   a feed disposed on the circuit board;
   an electric-conductor disposed on the support, wherein the electric-conductor is electrically connected to the feed; and
   a radiating element disposed on the insulation film layer, wherein a gap is formed by between the radiating element and the electric-conductor, and the electric-conductor indirectly couples the radiating element in a capacitively coupled manner,
   wherein a height of the radiating element relative to the support is between 0.2 mm to 0.6 mm.

2. The mobile terminal according to claim 1, wherein the insulation rear housing is a glass rear housing.

3. The mobile terminal according to claim 1, wherein the radiating element comprises silver, aluminum, or copper.

4. The mobile terminal according to claim 1, wherein a thickness of the radiating element is between 1 μm and 200 μm.

5. The mobile terminal according to claim 4, wherein an impedance of the radiating element is less than 3 ohms.

6. The mobile terminal according to claim 1, wherein a square resistance of the radiating element is less than 1 ohm/□.

7. The mobile terminal according to claim 1, wherein the insulation film layer comprises at least one of the following:
   an ink film layer, a decorative film layer, or an explosion-proof film layer.

8. The mobile terminal according to claim 1, wherein the antenna further comprises a ground disposed on the circuit board, the electric-conductor is electrically connected to the ground.

9. The mobile terminal according to claim 8, wherein,
   a first end of the electric-conductor is electrically connected to the feed, and a second end of the electric-conductor is connected to the radiating element in a coupled manner; or
   the first end of the electric-conductor is electrically connected to the ground, and the second end of the electric-conductor is connected to the radiating element in a coupled manner; or
   the first end of the electric-conductor is electrically connected to the feed, the second end of the electric-conductor is electrically connected to the ground.

10. The mobile terminal according to claim 1, wherein the electric-conductor is a metal spring plate.

11. The mobile terminal according to claim 10, wherein the metal spring plate is an inverted L-shaped metal spring plate or an inverted U-shaped metal spring plate.

12. The mobile terminal according to claim 1, wherein the insulation rear housing comprises a flat plate and a bent side wall, and an arc-shaped transition is used at a joint between the bent side wall and the flat plate.

13. The mobile terminal according to claim 12, wherein the radiating element is disposed on the flat plate of the insulation rear housing.

14. The mobile terminal according to claim 1, wherein the radiating element extends a predetermined distance from the edge of the insulation film layer.

15. The mobile terminal according to claim 12, wherein the radiating element is disposed on the bent side wall of the insulation rear housing.

16. A mobile terminal antenna production method comprising:
   disposing a radiating element on an insulation film layer;
   disposing the insulation film layer to an inner side of an insulation rear housing, wherein the insulation rear housing covers a mobile terminal body, and the inner side of the insulation rear housing is a surface facing the mobile terminal body;

producing a feed on a circuit board in the mobile terminal body;

disposing a support on the circuit board, wherein the support is insulated;

disposing an electric-conductor on the support; and electrically connecting the electric-conductor to the feed, wherein a gap is formed by the radiating element and the electric-conductor, and the electric-conductor indirectly couples the radiating element in a capacitively coupled manner, wherein a height of the radiating element relative to the support is between 0.2 mm to 0.6 mm.

17. The mobile terminal production method according to claim 16, wherein a thickness of the radiating element is between 1 μm and 200 μm, and an impedance of the radiating element is less than 3 ohms or a square resistance of the radiating element is less than 1 ohm/☐.

18. The mobile terminal production method according to claim 16, wherein the insulation rear housing comprises a flat plate and a bent side wall, an arc-shaped transition is used at a joint between the bent side wall and the flat plate, and the radiating element extends a predetermined distance from the edge of the insulation film layer.

19. The mobile terminal production method according to claim 16, wherein the disposing of the radiating element on the insulation film layer comprises:

printing silver paste on the insulation film layer.

20. The mobile terminal production method according to claim 19, wherein the silver paste includes 50-99 wt % silver powder.

* * * * *